R. C. BRADLEY.
MEASURING DEVICE.
APPLICATION FILED NOV. 14, 1913.
1,120,897.
Patented Dec. 15, 1914.
2 SHEETS—SHEET 2.
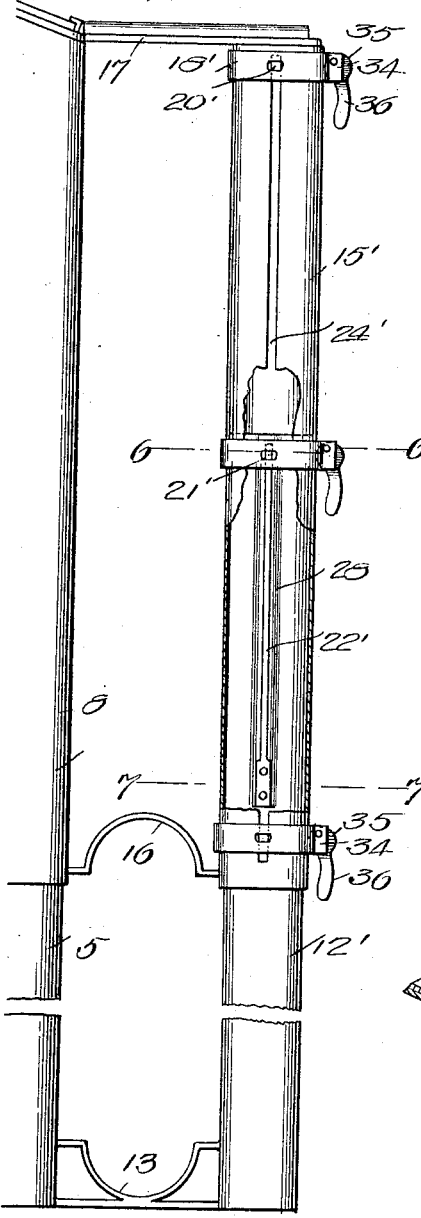
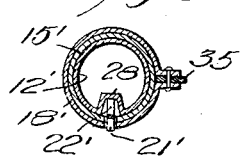
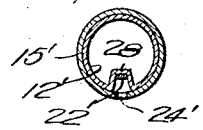
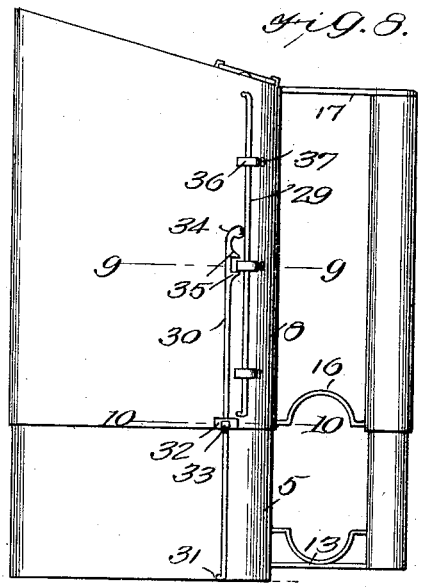
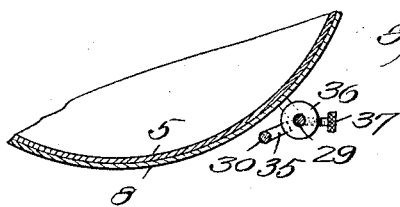
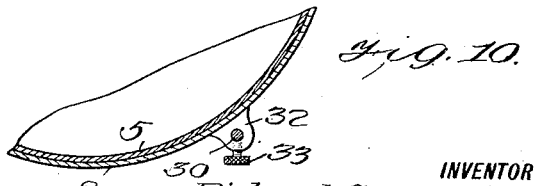
WITNESSES
F. C. Barry
Alan F. Garner
INVENTOR
Richard C. Bradley
BY Munn & Co.
ATTORNEYS

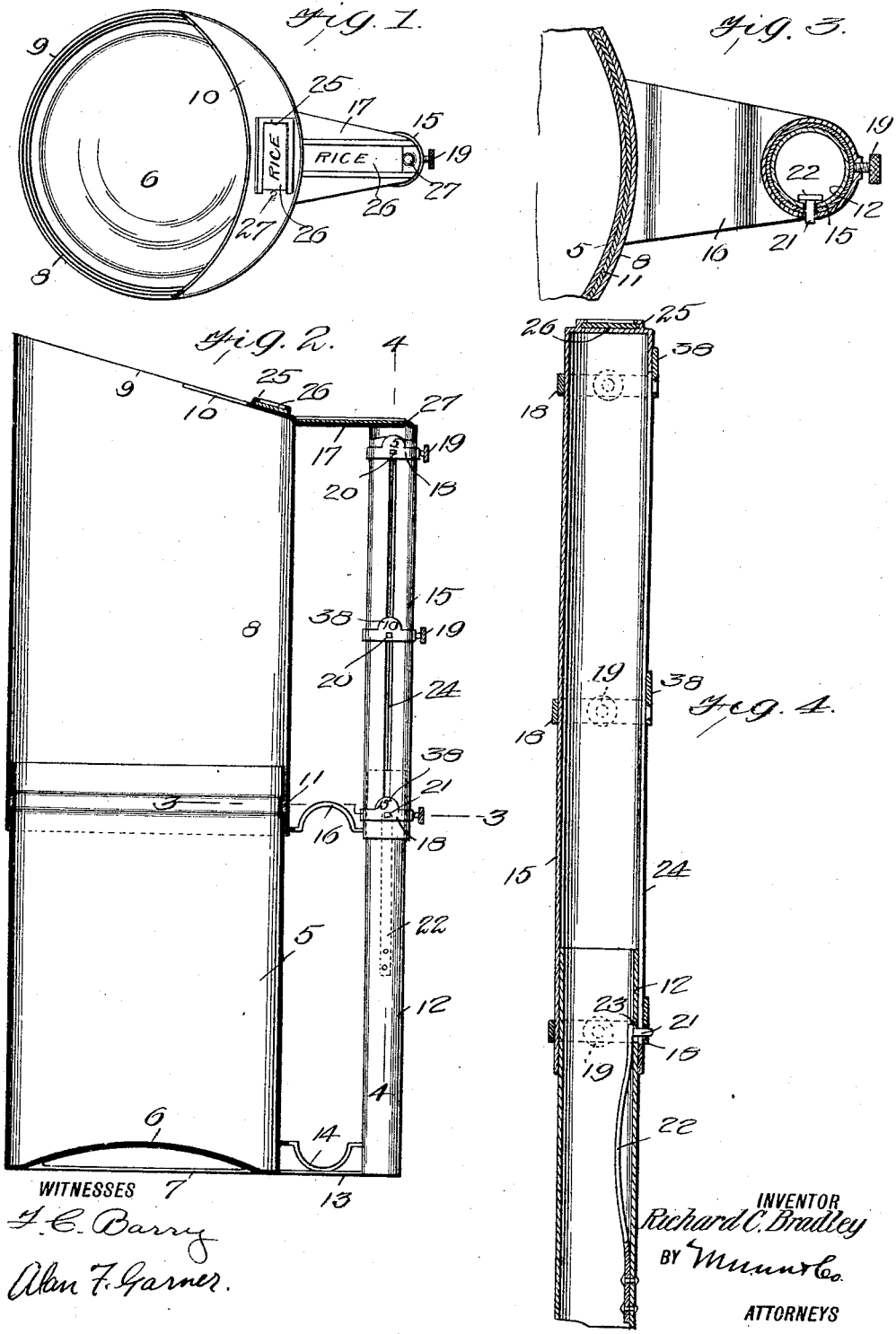

UNITED STATES PATENT OFFICE.

RICHARD CLINTON BRADLEY, OF SHREVEPORT, LOUISIANA.

MEASURING DEVICE.

1,120,897.  Specification of Letters Patent.  Patented Dec. 15, 1914.

Application filed November 14, 1913. Serial No. 800,975.

*To all whom it may concern:*

Be it known that I, RICHARD C. BRADLEY, a citizen of the United States, and a resident of Shreveport, in the parish of Caddo and State of Louisiana, have made certain new and useful Improvements in Measuring Devices, of which the following is a specification.

This invention relates to measuring devices and more particularly to a computing cup or scoop.

One of the principal objects of the invention is to provide a scoop which may be adjusted for measuring predetermined quantities of commodities, and which will indicate the price to be charged for each quantity or amount.

A further object is to provide means for adjusting the scoop section for measuring various quantities of commodities, and means for locking the sections in adjusted position.

Another object of the invention is the provision of a device of the class described which will be simple, durable, efficient in operation, and inexpensive to manufacture.

With these and other objects in view, which will become apparent as the description proceeds, the invention resides in the construction, combination and arrangement of parts hereinafter more fully described and claimed, and illustrated in the accompanying drawings, in which like characters of reference indicate like parts throughout the several figures, of which—

Figure 1 represents a top plan view of a scoop constructed according to my invention, Fig. 2 represents a vertical transverse sectional view taken therethrough, showing the handle partially in elevation and partially broken away, Fig. 3 represents an enlarged fragmentary horizontal sectional view on the line 3—3 of Fig. 2, Fig. 4 represents an enlarged vertical transverse sectional view on the line 4—4 of Fig. 2, Fig. 5 represents an enlarged elevational view partly in section of the handle and a portion of the scoop showing a modification of the handle construction, Figs. 6 and 7 represent horizontal sectional views on the lines 6—6 and 7—7 respectively, of Fig. 5, Fig. 8 represents a side elevational view of a scoop, showing the application of a modified form of adjusting means, and Figs. 9 and 10 represent enlarged fragmentary horizontal sectional views on the lines 9—9 and 10—10 respectively of Fig. 8.

Referring more particularly to the drawings, the scoop comprises a lower tubular section 5 provided with a concavo-convex bottom 6, and a strap 7 bridging said bottom on the concaved side thereof to form a hand hold; and an upper section 8 of tubular formation telescopically engaging over section 5 and having its upper edge beveled as at 9 and partially closed by a guard 10. A suitable gasket 11 is seated in an annular groove on the outer surface of section 5 near the upper edge thereof for contacting with section 8, to provide a tight joint between the sections of the scoop.

The scoop handle comprises a lower tubular member 12 connected in spaced parallel relation with section 5 by a skeleton brace 13, provided with the concaved portion 14 to form a finger or thumb hold; and an upper tubular handle 15 telescopically engaging over member 12 and supported in spaced relation to section 8 by means of a central brace 16 provided with a concaved portion to form a finger hold, and by an upper brace 17 connected to the upper closed end of member 15 and to the upper end of section 8 near guard 10.

In order to adjust the position of the scoop sections relatively to each other for measuring out a predetermined amount of a commodity, there has been provided a plurality of collars 18 slidably positioned on handle member 15 and adapted to be secured in adjusted position by means of set screws 19, said collars provided with openings 20 therein adapted to be engaged by a pin 21 formed on the upper end of a leaf spring 22 secured at its lower end to the interior of handle member 12 near the upper end of said member, said pin 21 extending through an opening 23 in member 12 and adapted to travel through a slot 24 formed longitudinally of member 15 and alining with openings 20 in collars 18, as the members are telescoped for engaging the pin in the various collars to vary the capacity of the scoop.

Flanged card receivers 25 are provided on the upper surface of guard 10 and brace 17 for retaining cards 26, which bear the name of the particular commodity to be measured by the scoop, and a bead 27 is struck up near the open end of each receiver to prevent loss of the card therefrom.

The lower handle member 12' illustrated in Figs. 5, 6 and 7 instead of having the spring 22 secured to the inner side thereof, is provided with a longitudinal depression or groove 28 in its outer surface near the upper end thereof, in which is seated a spring 22' similar to spring 22, and carrying a pin 21' at its upper end adapted to travel through a slot 24' similar to slot 24 in the upper member 15', and to be positioned alternately in openings 20' formed in collars 18' similar to collars 18, except that they are provided with outwardly extending flanges 34 at their meeting ends between which are eccentrically pivoted, the enlarged ends 35 of levers 36, which levers when in lowered position as shown in Fig. 5, lock collars 18' in adjusted position on the upper member of the handle, but which when raised, allow the collars to be slid over said member to be locked in other positions.

The adjusting means illustrated in Figs. 8, 9 and 10, comprise a rod 29 having its ends bent inwardly and secured to the outer surface of upper section 8 of the scoop, to position said rod in spaced relation to said section, and longitudinally thereof; and a second rod 30 secured at its lower end in spaced relation to the lower end of section 5 as at 31, and extending slidably through a lug 32 on the lower edge of section 8, said lug provided with a set screw 33 adapted to be turned into engagement with rod 30, and the upper end of rod 30 is provided with a knob 34 to be engaged by the thumb of an operator, and is provided below said knob with a pair of lugs 35 adapted to engage between them one of a plurality of collars 36, slidably positioned on rod 29 and adapted to be adjusted thereon by means of set screws 37.

The rod 30 is preferably formed of spring material and is adapted to normally remain at its upper end in proximity to rod 29 so as to engage one of the collars 36. When this means of adjusting the scoop sections is used, the handle members may be formed of plain tubes telescopically engaging each other as illustrated.

In using the scoop, various quantities of merchandise to be given for various amounts of money are measured, and the collars 18, 18' or 36, as the case may be, are adjusted at such positions that when they are engaged by their coacting means, the scoop will be adjusted to hold the various predetermined amounts, and the said collars may be provided with tabs 38, as illustrated in Fig. 2, for bearing numerals indicating the price to be charged for the various amounts measured out, or they may be left plain, the amounts to be charged being known by the clerk or person using the scoop.

In adjusting the scoop sections by the means shown in either Fig. 2 or 5, the pin carried by the spring is pushed inwardly to disengage said pin from the collar, whereby the sections may be slid one over the other in the direction preferred, the pin traveling in the slot in the upper section of the member to be engaged in the desired collar.

To operate the adjusting means shown in Fig. 8, the upper end of bar 30 is pressed out of engagement with one of the collars by the contact of the thumb or finger of the operator with knob 34, and the sections may be adjusted whereby upon release of the knob, the bar will spring into engagement with the desired collar.

Although I have shown the collars to be three in number in each instance, it is to be understood that the number and arrangement of the collars is optional and will be determined by the nature of the goods and the amounts in which it is generally sold.

Although I have described the preferred embodiments of my invention, I may desire to make such changes in the construction, combination and arrangements of the parts thereof, as do not depart from the spirit of the invention, and the scope of the appended claims.

I claim:—

1. In a device of the class described comprising upper and lower body sections telescopically engaging, said lower section provided with a concavo-convex bottom, a strap spanning said bottom on its concaved side to form a hand hold, said upper section having one end beveled and provided with a guard, a pair of handle members telescopically engaging each other and secured to the respective body sections, the lower handle member being spaced from the lower body section by a skeleton brace, and the upper handle member being spaced from the upper body section by means of braces, said upper body section and one of said braces provided with card receivers.

2. A device of the class described comprising upper and lower body sections telescopically engaging each other, adjustable collars carried by one body section and adapted to be adjusted in various positions longitudinally of said section, means for carrying the adjustable collars and means on the other body section for engaging said collars to hold said sections in variously adjusted positions.

3. In a device of the class described comprising upper and lower body sections telescopically engaging each other, spring means carried by one body section, and means adjustable longitudinally of the other body section adapted to be engaged by said spring means for holding said sections in adjusted relation.

4. A device of the class described, comprising a pair of body sections telescopically engaging each other, handle members carried by said sections in spaced relation thereto, and telescopically engaging each other, a rod secured to one of said sections in spaced relation thereto, and provided with a plurality of collars slidable on said rod, means for clamping said collars on the rod, a second rod connected at one end in spaced relation to the opposite section, a lug on first said section, said second rod slidably supported by said lug, said second rod having one end free and provided with a knob and with a pair of lugs for engaging said collars for normally holding said sections in adjusted position.

5. A device of the class described comprising a pair of telescoping body sections, telescoping handle members carried by said body sections, a rod carried by one of said body sections in spaced relation thereto, a plurality of collars slidably positioned on said rod, means for clamping said collars on said rod and means carried by the opposite section for engaging said collars for holding said sections in adjusted position.

6. A device of the class described comprising a pair of telescoping body sections, telescoping handle members carried by said sections, a spring carried by one of said sections, and means on the other section for engaging said spring for holding said section in adjusted position, said means being adjustable longitudinally of the said other section.

7. In a device of the class described comprising a pair of body sections movable relatively to each other, spring means carried by one of said sections, means carried by the second section for guiding the same on said spring means, and means adjustable longitudinally of the second section adapted to be engaged by said spring means to secure said sections in adjusted position relatively to each other.

8. A device of the class described comprising a plurality of sections adjustable relatively to one another, a stationary member connected with one of the sections, a movable member connected with another section and adapted to be engaged by said stationary member for holding said sections in adjusted position, means for connecting the movable member with the other section, and means whereby said movable member may be adjusted relative to said sections independently of the movement of the latter.

RICHARD CLINTON BRADLEY.

Witnesses:
  J. M. BLACKMAN,
  A. D. KEENEY.

Copies of this patent may be obtained for five cents each, by addressing the "Commissioner of Patents, Washington, D. C."